United States Patent [19]

Lailach et al.

[11] Patent Number: 4,824,655

[45] Date of Patent: Apr. 25, 1989

[54] PROCESS FOR THE PREPARATION OF SULPHUR DIOXIDE

[75] Inventors: Günter Lailach; Rudolf Gerken, both of Krefeld, Fed. Rep. of Germany

[73] Assignee: Bayer Aktiengesellschaft, Leverkusen, Fed. Rep. of Germany

[21] Appl. No.: 97,241

[22] Filed: Sep. 15, 1987

[30] Foreign Application Priority Data

Oct. 3, 1986 [DE] Fed. Rep. of Germany ....... 3633710

[51] Int. Cl.$^4$ ............... C01B 17/50; C01B 17/52; C01B 17/90
[52] U.S. Cl. ............... 423/541 R; 423/531; 423/539; 423/542
[58] Field of Search ............ 423/522, 531, 541 R, 423/541 A, 542, 543

[56] References Cited

U.S. PATENT DOCUMENTS

| | | | |
|---|---|---|---|
| 2,039,645 | 5/1936 | Hechenbleikner | 423/542 |
| 2,209,331 | 7/1940 | Haglund | 423/542 |
| 2,789,034 | 4/1957 | Swaine et al. | 423/542 |
| 3,454,360 | 7/1969 | Detweiler | 423/542 |

FOREIGN PATENT DOCUMENTS

| | | | |
|---|---|---|---|
| 582360 | 9/1959 | Canada | 423/542 |
| 3328708 | 2/1985 | Fed. Rep. of Germany | 423/542 |
| 3328710 | 2/1985 | Fed. Rep. of Germany . | |
| 350751 | 9/1972 | U.S.S.R. | 423/542 |
| 385907 | 9/1973 | U.S.S.R. | 423/542 |
| 1010009 | 4/1983 | U.S.S.R. | 423/543 |
| 702548 | 1/1954 | United Kingdom | 423/542 |

*Primary Examiner*—Gary P. Straub
*Attorney, Agent, or Firm*—Sprung Horn Kramer & Woods

[57] ABSTRACT

A process for the preparation of sulphur dioxide by the thermal decomposition of metal sulphates in a fluidized bed reactor with sulphur-containing reducing agents and energy suppliers, characterized in that a mixture comprising the metal sulphates, the sulphur-containing reducing agents and 75 to 99% of the energy suppliers is fed into the fluidized bed reactors and the remainder of the energy suppliers is introduced separately into the fluidized layer of the fluidized bed reactor.

5 Claims, No Drawings

PROCESS FOR THE PREPARATION OF SULPHUR DIOXIDE

BACKGROUND OF THE INVENTION

1. Field of the Invention

This invention relates to a process for the preparation of sulphur dioxide by the thermal decomposition of metal sulphates in fluidized bed reactors with reducing agents containing sulphur and energy suppliers.

2. Background Information

Fluidized bed reactors have on the whole been found to be the most satisfactory apparatus for the thermal decomposition of metal sulphates, in particular of sulphuric acid-containing salt mixtures rich in iron sulphate monohydrate of the kind obtained in the recovery of sulphuric acid from dilute titanic acid or mordanting or pickling liquors. They are distinguished by their high specific output and relatively low maintenance costs.

Both sulphur and iron pyrites, as well as carboncontaining fuels, such as coal, coke and fuel oil, are used as reducing agents and energy suppliers for the highly endothermic reactions. It is advantageous to use sufficient reducing agent containing sulphur to produce a gas mixture which, when mixed with air, contains at least 6 vol.-% of $SO_2$ and 6 vol.-% of $O_2$ and is suitable for the formation of $SO_3$ in contact with the sulphuric acid catalyst. The amount of carbon-containing fuels put into the process is determined, not only by economical considerations, but also by the fact that decomposition of the metal sulphate must not yield a larger amount of $SO_2$ than can be used as such or as sulphuric acid. It is therefore frequently necessary to use sulphur-containing reducing agents and carbon-containing fuels at the same time.

To ensure as far as possible complete decomposition of the metal sulphates to metal oxides, $SO_2$ and $O_2$ it is necessary to provide for a sufficiently long dwell time in the reaction zone and a sufficient supply of energy. The latter requires thorough mixing of the metal sulphates with the reducing agents and fuels, while the former requires the reaction mixture to be introduced directly into the fluidized bed which has a high solids content. One method which has proved to be reliable for this purpose is the injection of a metal sulphate suspension into the fluidized bed layer from the side. This method has the advantage that a suspension is more easily handled than solid substances, especially if the metal sulphates contain sulphuric acid as residual moisture. Additional problems arise if very fine flotation iron pyrites is used instead of the nowadays almost unobtainable fine iron pyrites which is relatively coarse by comparison. In DE-A No. 3,328,710, it is proposed to deal with this problem by moistening the flotation iron pyrites with sulphuric acid and injecting it into the fluidized bed layer.

If a fluidized bed reactor is very large, problems arise because uniform mixing of the energy consuming starting materials and the energy supplying starting materials in the fluidized bed can at best only be achieved approximately. With a view to obtaining uniform distribution of the metal sulphates and of the flotation iron pyrites and at the same time enabling trouble-free introduction of the flotation iron pyrites into the fluidized bed reactors to be achieved, it is proposed in DE-A No. 3,328,710 to prepare granules in particular of metal sulphates containing sulphuric acid and to cover these with flotation iron pyrites. These granules composed of a hygroscopic core and a protecting shell of iron pyrites can readily be introduced into the reactors, but problems arise if a relaitvely large quantity of carbon-containing fuels are required for providing the necessary amount of energy for the reaction. If the fuels are introduced in large quantities into the fluidized bed layer from the side or from below. Then localized zones of highly reducing conditions are created which considerably interfere with the operation of the reactor, whereas in other zones the fluidized bed cools down due to lack of fuel so that insufficient sulphate decomposition takes place.

SUMMARY OF THE INVENTION

It is therefore an object of the present invention to provide an economical process which is free from the disadvantages of the processes described.

It is one particular aim of this invention to achieve trouble-free processing of metal sulphates containing sulphuric acid as residual moisutre. In particular, flotation iron pyrites are to be used as sulphur-containing raw material.

To solve this problem, a portion of the energy required for the decomposition of metal sulphates in fluidized bed reactors is provided by a separate supply of energy or fuel which is introduced into the reactors at a controlled rate in dependence upon the reaction temperature.

The present invention thus relates to a process for the preparation of sulphur dioxide by thermal decomposition of metal sulphates in fluidized bed reactors by means of sulphur-containing reducing agents and energy suppliers, characterised in that a mixture consisting of the metal sulphates, the sulphur-containing reducing agents and 75 to 99 % of the necessary energy suppliers is fed into the fluidized bed reactors and the remainder of the energy suppliers is introduced separately into the fluidized layer of the fluidized bed reactors.

DETAILED DESCRIPTION OF THE INVENTION

The supply of this energy is advantageously so controlled that the reaction temperature in the reactors is maintained even if the composition of the compacted mixture of raw materials varies. This proportion of energy, amounting to 1 to 25 % of the total energy for decomposition, may be introduced by preheating the fluidization and combustion air to a temperature of 25 to 400° C.; alternatively, it may be provided by the introduction of easily dosed carbon-containing fuels into the fluidized bed layer.

In one particularly preferred embodiment of the process according to the invention, therefore, the additional energy suppliers are introduced in the form of carbon-containing fuels.

In another preferred embodiment of the process according to the invention, the additional energy suppliers are introduced into the reactor by preheating the fluidization air or fluidization air which has been enriched with oxygen.

The fuels which are to be introduced directly into the fluidized bed reactors may be fed into the fluidized layer of solids at one or more points from the side or from below. Fuel oil, natural gas and finely divided coal are suitable fuels for this purpose. The latter is preferably introduced pneumatically.

According to one particularly advantageous embodiment of the process of the invention, the additional energy suppliers are introduced into the reactor by mixing the fluidization air with a maximum of 2 vol.-% of combustible gases.

The preferred sulphur-containing reducing agents for the purpose of this invention are sulphur and/or iron pyrites. It is difficult to transport metal sulphates containing sulphuric acid and to dose them and introduce them into reactors. According to the state of the art, the problems may to a large extent be overcome by introducing the sulphates in the form of suspensions in water or sulphuric acid. The higher the water content of the metal sulphates to be decomposed, the more energy will be consumed for the evaporation of this water at temperatures of 800 to 1100° C. An economically advantageous embodiment of the process according to the invention consists in that the metal sulphates optionally containing sulphuric acid are mixed with the sulphur-containing reducing agents and at least a proportion of the additional energy suppliers are compacted, preferably granulated, briquetted or pelletized, and then introduced into the fluidized bed reactor in this form.

If compacted mixing of raw materials is to be employed, the sulphur-containing reducing agents used may be sulphur, impure sulphur waste and/or iron pyrites, preferably flotation iron pyrites. The carbon fuels used may be coal, coke and/or heavy fuel oil. If thixotropic metal sulphates containing sulphuric acid are used, compacting of the mixtures of raw materials may cause problems. These may be avoided by adding a small quantity (as little as possible) of the residue of metal sulphate decomposition to the mixture as lean material. It is preferable, however, to remove sufficient moisture from the metal sulphates by mechanical means at the stage of removal of the sulphuric acid, e.g., by blowing air through the metal sulphates or pressing out the moisture content, so that the metal sulphates will at most be only slightly thixotropic and may then be easily compacted in the mixture with the sulphur-containing and carbon-containing raw materials.

Compacting may be carried out by various known processes such as granulating, pelletizing or briquetting. The compacted raw materials may be broken down to a suitable particle size for fluidization before they are introduced into the fluidized bed reactors.

The process according to the invention provides in particular the following advantages: Uniform temperature distribution is obtained in the fluidized bed and hence maximum sulphate decomposition. The required reaction temperature can be maintained even if the composition of the mixture of raw materials varies within the limits determined by the nature of the raw materials and the process employed.

Large local differences in temperature and in gas composition (oxidizing/reducing) are avoided, especially if the energy for controlling the temperature is supplied by heating of the fluidization gas (air or air enriched with oxygen).

Raw materials which are by nature sticky and therefore difficult to handle can easily be introduced into the fluidized bed reactors as compacted mixtures without the aid of substances such as water or sulphuric acid.

The advantages of the process according to the invention will be illustrated by the following Examples which are not to be regarded as limiting.

EXAMPLE 1

12 t/h of metal sulphates and hydrogen sulphates (predominantly $FeSO_4 \cdot H_2O$ in addition to compounds of Al, Mg, Ti, Mn, Cr and V) containing 13 to 15 % by weight of 65 % $H_2SO_4$ as residual moisture (contents varied due to batchwise filtration) were continuously mixed with 4.3 t/h of flotation iron pyrites (48 % by weight S; moisture content 5.5 % by weight; 90 % of particles below 0.1 mm) and 1.9 t/h of abrasion dust from briquettes, and pelletized. The pellets were temporarily stored in a storage bin. The pellets were then withdrawn from the bin at the rate of 8.2 t/h. The compacted mixture fell into an injector from which it was blown into the side of an approximately 1.5 m high fluidized bed layer by means of compressed air.

19,000 $m^3$ air/h (all volume figures based on standard conditions) were injected through the 12 $m^2$ base of the fluidized reactor. An average of 280 $m^3$/h of natural gas was added to the fluidization air to maintain the reaction temperature in the fluidized bed at 950 to 970° C. The instantaneous rate of flow of natural gas was in the region of 200 to 340 $m^3$/h. The decomposition gases leaving the reactor had the following composition (leaving out of account the combustion dust):

1–1.5 vol.-% $O_2$
11–12 vol.-% $SO_2$
7.8–8.2 vol.-% $CO_2$
58–59 vol.% $N_2$
20.5–21.5 vol.% $H_2O$
$<10$ $mg/m^3_n$ combustible gases.

The rate of $SO_2$ production was 8.5 t/h.

EXAMPLE 2

Raw materials analogous to those of Example 1 were mixed in the following average proportions by weight and briquetted:

100 parts by weight of metal sulphates containing sulphuric acid
30 parts by weight of flotation iron pyrites
9 parts by weight of sulphur (particle size $<5$ mm)
16 parts by weight of briquette abrasion dust.

21.2 t/h of briquettes were introduced into the fluidized bed reactor by a procedure analogous to that of Example 1.

The desired reaction temperature of 950 to 970° C. was maintained by heating the 19,000 $m^3$/h of fluidization air to a temperature of 210 to 330° C. in a preheater fired with natural gas.

The decomposition gases contained (without combustion waste)

1–1.5 vol.-% $O_2$
12–12.4 vol.-% $SO_2$
7.7–8.1 vol.-% $CO_2$
57.5–58 vol.-% $N_2$
20.9–21.3 vol.-% $H_2O$.
$<10$ $mg/m^3_n$ combustible gases.

The rate of $SO_2$ production was 9 t/h.

It will be appreciated that the instant specification and claims are set forth by way of illustration and not limitation, and that various modifications and changes may be made without departing from the spirit and scope of the present invention.

What is claimed is:

1. In a process for the preparation of sulphur dioxide comprising thermally decomposing a metal sulphate and/or a metal hydrogen sulphate in a fluidized bed reactor having a fluidized layer and being supplied with fluidizing air, with a sulphurcontaining reducing agent selected from the group consisting of sulphur, iron pyrites and a mixture thereof, the improvement which comprises (a) controlling the amount of reducing agent to sulphate in a manner such that there is an sufficient amount of reducing agent to convert the sulphate to sulphur dioxide, "said amount being insufficient to provide all the necessary heat for the process", (b) supplying 75 to 99% of the balance of the necessary energy to convert the sulphate to sulfur dioxide by a first energy supplier, said first energy supplier being a fuel selected from the group consisting of coal, coke, heavy fuel oils and mixtures thereof, said first energy supplier being fed into the fluidized bed reactor along with the metal sulphate and the sulphur containing reducing agent, (c) supplying the remainder of the balance of the necessary energy to convert the sulphate to sulphur dioxide by a second energy supplier selected from the group consisting of fuel oil, natural gas and finely divided coal, the second energy supplier being introduced separately into the fluidized layer of the fluidized bed reactor and the second energy supplier being introduced into the reactor by mixing the fluidization air and (d) controlling the amount of the second energy supplier so that a reaction temperature of 800° C. to 1100° C. is maintained in the reactor.

2. A process according to claim 1, wherein the second energy supplier is transported to the reaction by preheated air or oxygen enriched air.

3. A process according to claim 1, wherein the iron pyrites are flotation iron pyrites.

4. A process according to claim 1, wherein the mixture of the metal sulphate, the sulphur-containing reducing agent and the first energy supplier is compacted.

5. A process according to claim 1 wherein the second energy supplier is natural gas and is mixed with the fluidization gas at a maximum of 2 volume %.

* * * * *